(12) United States Patent
Besch

(10) Patent No.: US 7,472,488 B2
(45) Date of Patent: Jan. 6, 2009

(54) ANIMAL SIZING SYSTEM, METHOD, AND APPARATUS FOR ASSISTANCE WHILE HUNTING GAME

(76) Inventor: Konrad Besch, 735 Heather Hills Dr., Dripping Springs, TX (US) 78620

( * ) Notice: Subject to any disclaimer, the term of this patent is extended or adjusted under 35 U.S.C. 154(b) by 0 days.

(21) Appl. No.: 11/750,434

(22) Filed: May 18, 2007

(65) Prior Publication Data

US 2008/0115398 A1    May 22, 2008

Related U.S. Application Data

(60) Provisional application No. 60/809,666, filed on May 31, 2006.

(51) Int. Cl.
  *G01B 3/02* (2006.01)
(52) U.S. Cl. .......................... 33/511; 33/679.1
(58) Field of Classification Search ............ 33/494, 33/511, 679.1
  See application file for complete search history.

(56) References Cited

U.S. PATENT DOCUMENTS

| | | | |
|---|---|---|---|
| 0,325,134 A | 8/1885 | Wainwright | |
| 2,324,334 A | 7/1943 | Sutton | |
| 3,908,281 A * | 9/1975 | Fox | 33/276 |
| 4,196,521 A | 4/1980 | Hutchinson et al. | |
| 4,323,234 A * | 4/1982 | Glaese | 33/494 |
| 4,407,070 A | 10/1983 | Lowe | |
| 4,823,476 A | 4/1989 | Curtin | |
| 5,012,590 A * | 5/1991 | Wagner et al. | 33/494 |
| 5,236,386 A | 8/1993 | Dingee | |
| 5,588,215 A * | 12/1996 | Hart | 33/494 |
| 5,884,408 A * | 3/1999 | Simmons | 33/494 |
| 6,073,359 A | 6/2000 | Lee | |
| 6,115,932 A * | 9/2000 | Fedora | 33/511 |
| 6,889,444 B2 | 5/2005 | Trout et al. | |
| 2006/0026856 A1 | 2/2006 | Scott | |

FOREIGN PATENT DOCUMENTS

| | | |
|---|---|---|
| EP | 1 250 839 A1 | 10/2002 |
| JP | 04139556 A | 12/1993 |
| WO | 88/04764 A1 | 6/1988 |

* cited by examiner

*Primary Examiner*—G. Bradley Bennett
(74) *Attorney, Agent, or Firm*—Bracewell & Giuliani LLP

(57) ABSTRACT

A hunting aid assists hunters in judging the size of animals they intend to harvest. The device is mounted to a support structure such as the leg of an animal feeder, a fence post, or a tree trunk. The invention is oriented such that it faces the anticipated location for viewing and hunting animals, such as a deer blind or stand. The antler width of animals that come to the feeder and device may be readily gauged by using brightly colored zones on the device.

18 Claims, 3 Drawing Sheets

ANIMAL SIZING SYSTEM, METHOD, AND APPARATUS FOR ASSISTANCE WHILE HUNTING GAME

This application claims priority to and the benefit of U.S. Provisional Patent Application No. 60/809,666, filed on May 31, 2006.

BACKGROUND OF THE INVENTION

1. Technical Field

The invention relates in general to estimating the size of animals and, in particular, to an improved system, method, and apparatus for sizing animals while hunting wild game to determine whether an animal is large enough or old enough to be harvested without violating the laws of the jurisdiction in which the animal is being hunted.

2. Description of the Related Art

Estimating the size of animals in the wild can be difficult due to many factors such as the distance from an animal, low light conditions (e.g., before sunrise), weather conditions, etc. The ability to correctly judge the size of an animal is particularly important for hunters. Legal jurisdictions such as states and counties have laws that regulate the seasons, types, number, and sizes of animals that can be legally harvested.

For example, some jurisdictions limit buck deer harvesting to those animals having an inside antler spread of 13 inches or greater. A legal buck deer may be defined as having: a hardened antler protruding through the skin and at least one unbranched antler; or an inside spread measurement between main beams of 13 inches or greater. To determine if a buck has an inside spread measurement of at least 13 inches, an estimate must be made of the distance from ear-tip to ear-tip on a buck with its ears in the alert position. Points are also used to judge deer antlers. A point is a projection that extends at least one inch from the edge of a main beam or another tine. The tip of the main beam is also a point. A legal deer also can have at least one unbranched antler. Although these various criteria are typically well defined by legal authorities, precise estimations of the criteria remains difficult for the reasons described above. Thus, some form of assistance for aiding and educating individuals in judging the size of animals would be desirable.

SUMMARY OF THE INVENTION

Embodiments of a system, method, and apparatus for aiding hunters in judging the size of the animals they intend to harvest is disclosed. The invention educates and rewards hunters with the benefits of a strong game management program.

The device may be mounted on an animal feeder, fence post, tree trunk, or other support structure, as a useful aid in the hunting area. The invention may be attached to the leg of the animal feeder such that it faces the anticipated location or vantage point for viewing and hunting animals (e.g., a deer blind or stand). A bracket secures the device to the mounting or supporting structure. In one embodiment, a strap is wrapped around the structure and inserted through and secured to the device, which should be leveled for optimum usage. When animals come to the feeder, antler width may be gauged by using brightly colored zones on the device.

For example, when a buck is in close proximity to the invention, a hunter may gauge the buck's antler width by using the brightly colored sizing zones on the device. In one embodiment, a small red zone on the device measures 13 inches from end to end. An intermediate yellow zone measures 23 inches from end to end, and a large green zone measures 33 inches from end to end. If the size of the antlers of the buck appears to be inside the red zone, the hunter should refrain from harvesting the buck. If the size of the antlers appears to fall inside the yellow zone the buck may be considered legal game in most hunting areas. When the size of the antlers fall in the green zone the buck is exceptional in size. The decision to harvest bucks that are sized in either the yellow or green zones should be made in consideration with the local game management plan. Parents also may use the device to educate young hunters and teach them the benefits of restraint as well as the basic safety measures that they will need to become excellent hunters and land stewards.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
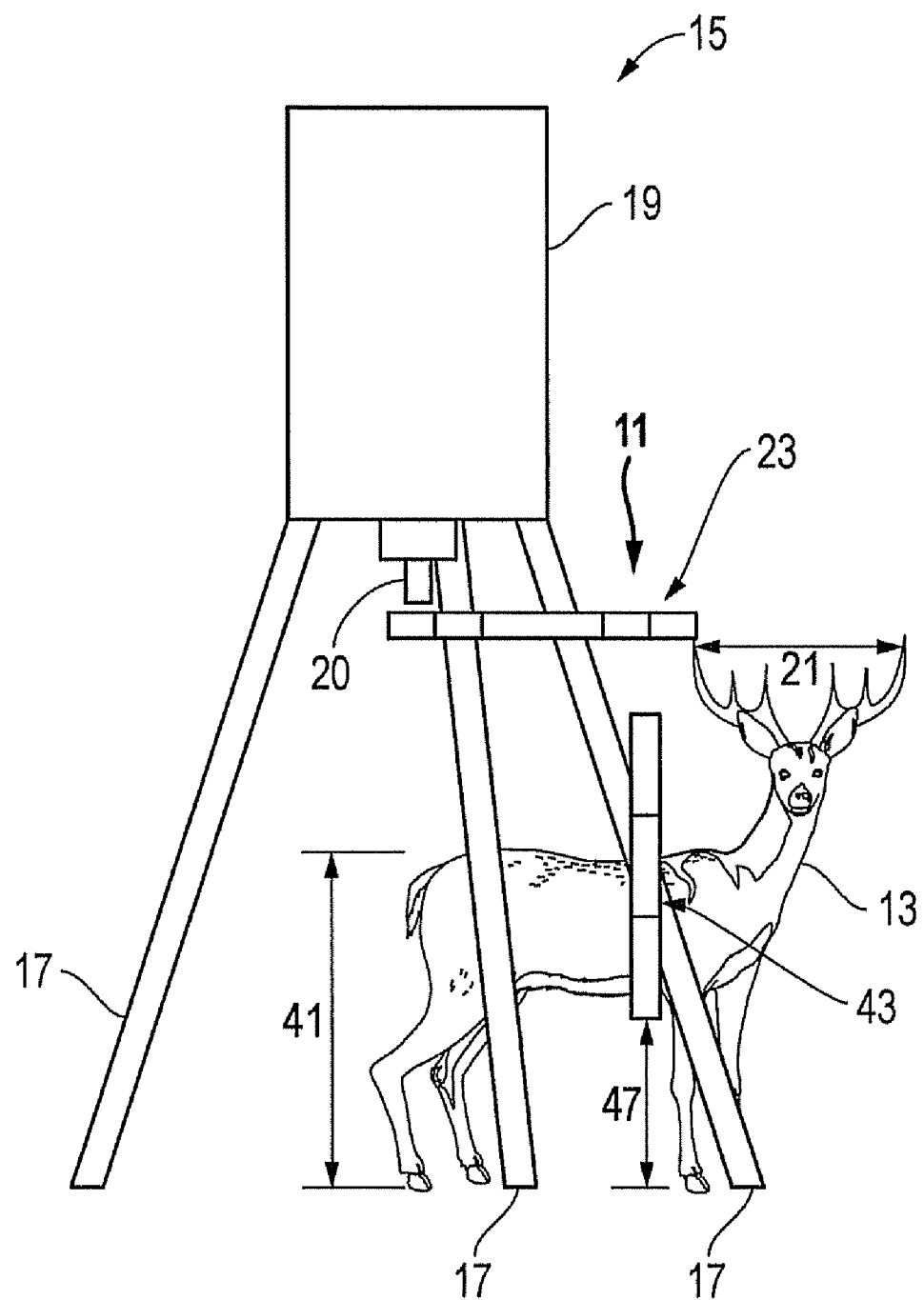
FIG. 1 is a schematic view of one embodiment of an animal sizing device installed on an animal feeder and is constructed in accordance with the present invention.
Figure 2:
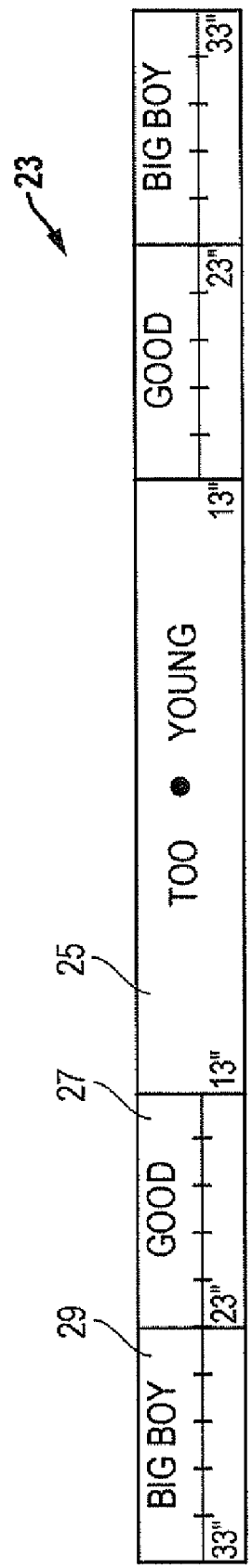
FIG. 2 is an enlarged front view of one embodiment of an animal sizing device constructed in accordance with the present invention.
Figure 3:
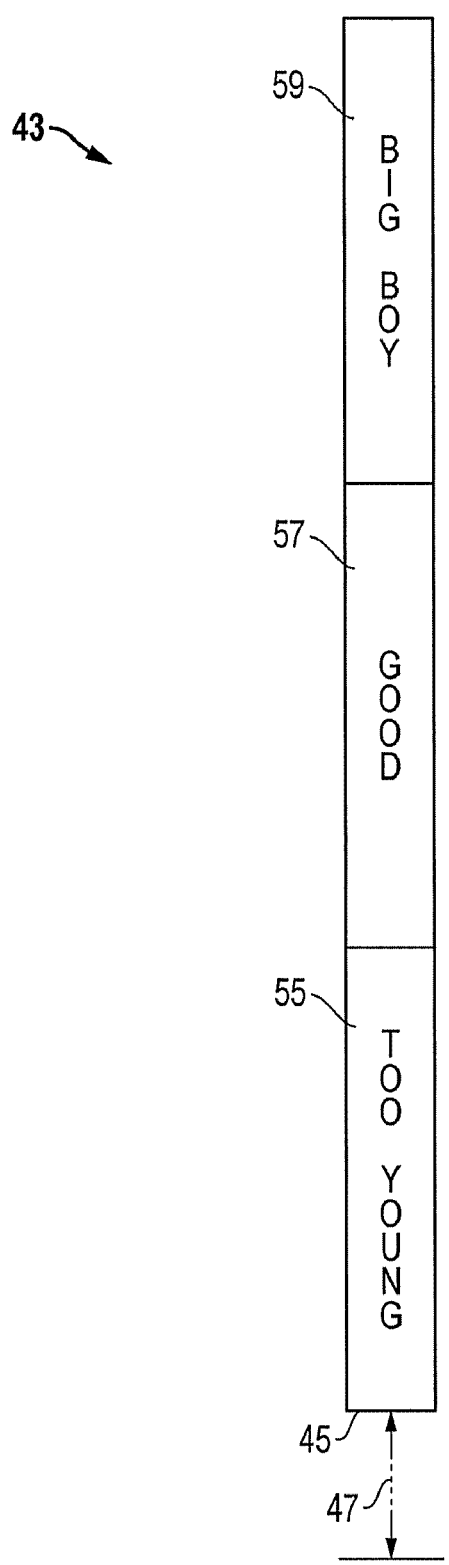
FIG. 3 is an enlarged front view of another embodiment of an animal sizing device constructed in accordance with the present invention.

Referring to FIGS. 1-3, embodiments of a system, apparatus, and method for estimating the size of animals is shown. The invention is particularly well suited for helping hunters approximate the age of wild game while hunting. In one embodiment, the invention provides a visual tool 11 to which animals, such as deer 13, can be compared to help hunters determine whether a particular animal is mature enough to be harvested.

The tool 11 may be mounted to its own structural support (e.g., a frame), a tree, or a feeding device (i.e., "feeder") 15, as shown. The illustrated feeder 15 has three legs 17 on which a feed reservoir 19 is mounted. As is commonly known in the art, the reservoir 19 dispenses feed (and may be automated to do so), such as corn or other food material, from a lower end 20 thereof in order to attract wild game such as deer 13.

Hunters frequently find it difficult to estimate the age of, for example, white tailed deer in the field for many reasons. Even experienced hunters occasionally have problems with estimating the age of animals due to their distance from the animals, weather conditions such as fog or rain, low light conditions, and the movement of other game in and around, for example, a feeder. Moreover, young or inexperienced hunters have seen very few deer in the field and, thus, have no experience in estimating the age of game. With no previous knowledge to which compare animals, hunters can accidentally shoot or take deer that are not yet mature enough to be harvested despite their best efforts to comply with local laws.

Such mistakes in judgment often lead to yearlings or very young bucks (e.g., also known as "button bucks") being taken by mistaking them for does or females. These types of male deer have only developed small buttons of horns on their heads, which are not readily visible to the naked eye or even through a rifle scope. Young females or does also can be taken by mistake by hunters that do not having anything to which compare them visually. Such inadvertent harvesting can have a devastating effect on a deer population when deer that have not yet matured to an adult level are taken.

Consequently, many jurisdictions have made it illegal to take a buck with an insufficient horn spread or "rack" (i.e., horizontal dimension) 21. See FIG. 1. For example, some counties have made it illegal to take a buck with a maximum horn spread of less than 13 inches. To assist hunters in making visual estimations of the sizes of animals from a distance, one embodiment of a horizontal component 23 (FIG. 2) of the present invention comprises a stiff rectangular substrate that is about 3 feet long, 2 inches wide. A plurality of visual segments are located on the substrate, and may comprise a single adhesive decal that is bonded to the substrate. The substrate is emblazoned with graphic indicia for illustrating physical ranges of measurement, such as colors, phrases, etc.

In the embodiment shown, the horizontal component 23 depicts an immature zone 25 (e.g., colored in red) that graphically illustrates a distance or length of about 13 inches (from end to end) to help hunters gauge an animal's antler spread. The immature zone 25 is located in the center of the device and extends symmetrically from a midpoint thereof to the left and right. The immature zone 25 appears as a brightly colored rectangular range of length and may include an appropriate text phrase for the range, such as "TOO YOUNG," that is horizontally oriented such that it may be read from left to right when the horizontal component 23 is properly installed.

In one embodiment, the horizontal component 23 also visually depicts an intermediate zone 27 (e.g., colored in yellow) that is adjacent to and extends laterally beyond (i.e., to the left and right of) the middle immature zone 25. The overall length of the intermediate zone 27 is about 23 inches from end to end. The intermediate zone 27 appears as two brightly colored, 5-inch long rectangular range segments of length and may include an appropriate text phrase for each range segment, such as "GOOD." In another embodiment, at least a portion of at least one of the visual segments or zones has a graduated ruler scale with numerical representations thereon.

The horizontal component 23 may further comprise a mature zone 29 (e.g., colored in green) that is located adjacent to and extends laterally beyond the two segments of the intermediate zone 27. The overall length of the mature zone 29 is approximately 33 inches from end to end. The mature zone 29 appears as two brightly colored, 5-inch long rectangular range segments of length and may include an appropriate text phrase for each range segment, such as "BIG BOY."

This series of visual indicators on the horizontal component 23 helps hunters determine which deer are mature and legal to harvest by comparing the rack 21 of the animal to the horizontal component 23. When animals are located in the proximity of the horizontal component 23, hunters can accurately estimate which of the zones 25, 27, 29 the animal's rack 21 appears to fall into.

Referring now to FIGS. 1 and 3, one embodiment of the invention also comprises an optional vertical component 43 for helping hunters estimate a height 41 of an animal 13. For example, some jurisdictions require a minimum shoulder height for harvesting animals, which be the height of an animal above the ground at its shoulder.

In the embodiment shown, the vertical component 43 only shows a limited range of heights, such that its lower edge 45 (FIG. 3) is set above the ground at a prescribed distance 47 (FIG. 1) to ensure the accuracy of the measurements. Vertical component 43 is similar in construction and layout, and is utilized in a manner analogous to the horizontal component 23 by incorporating different ranges of indicia or measurement to give hunters a parameter by which they may compare and judge the size and age of an animal.

To assist hunters in making this visual evaluation from a distance, one embodiment of the height or vertical component 43 of the invention depicts an immature zone 55 (e.g., colored red) at a lower end. The immature zone 55 is 11 inches long and provides a graphical comparison for an observer to estimate a height (e.g., shoulder height) of an animal located in the proximity of the device. The vertical component 43 also depicts an intermediate zone 57 (e.g., colored yellow) that is also 11 inches long and located immediately above the immature zone 55. In addition, a mature zone 59 (e.g., colored green) is 11 inches long and located above the intermediate zone 57 to provide a height reference for an animal observer. When an animal stands nearby the vertical component 43, an observer can make a well-informed decision about the approximate size and age of the animal based on, for example, a shoulder height of the animal. The vertical component 43 may be used alone or in conjunction with the above-described horizontal component 23, which also may be used alone without the vertical component 43.

The present invention has many advantages, including the ability to help hunters overcome confusion as to which animals are legal and mature. Since deer, including bucks and does, tend to congregate and move around a feeder, the invention gives a visual aid to the hunter to target an appropriately sized animal.

The invention is easily installed and fits any type of feeder support leg, including square, round and/or angle iron legs. Moreover, the invention can be removed and installed on a different type of feeder or any other place (e.g., trees, fence posts, t-posts, etc.) where game travel or congregate. Furthermore, this solution helps hunters avoid potential citations and/or fines from game wardens and wildlife officials. The invention also beneficially allows young deer to mature and reproduce, therefore sustain a healthy and mature deer herd.

While the invention has been shown or described in only some of its forms, it should be apparent to those skilled in the art that it is not so limited, but is susceptible to various changes without departing from the scope of the invention.

For example, the particular dimensions, shapes, colors, sizes, phrases, and other features described herein are merely representative and provided by way of example only. They are not intended to limit the invention in any manner as one skilled in the art would readily recognize that the invention may be adapted for many other applications, including different animals having different dimensions or other indicia, physical parameters, etc., for indicating information about such animals that would be informative and/or desirable to acquire for persons observing or monitoring such animals.

The invention may comprise a tool, provided with instructions, that is superior to merely "field judging" an animal on the hoof. The invention makes judging an animal quicker, easier, and more accurate than prior art techniques.

What is claimed is:

1. An apparatus for sizing animals, comprising:
a rigid body comprising a horizontal component having graphic indicia for estimating antler widths of animals, the graphic indicia including a plurality of visual zones located on the rigid body, each visual zone comprising a physical range of measurement and having a color that differs from other ones of the visual zones; wherein
the visual zones comprise an immature zone having a single segment located in a center of the rigid body, a mature zone comprising two segments each of which is located on respective ends of the rigid body, and an intermediate zone comprising two segments each of which is located between the immature zone and a respective one of the segments of the mature zone; and
the immature zone is symmetrically positioned between the two segments of the intermediate zone and the two segments of the mature zone.

2. An apparatus according to claim 1, wherein some of the physical ranges of measurement for the visual zones have a same length, and a length of the physical range of measurement for one of the visual zones is greater than either of the lengths of said some of the physical ranges of measurement.

3. An apparatus according to claim 1, wherein one of the visual zones is red and about 13 inches long, one of visual zones is yellow and about 23 inches long from end to end, one of the visual zones is green and about 33 inches long from end to end.

4. An apparatus according to claim 1, wherein each visual zone has a text phrase that differs from other ones of the visual zones.

5. An apparatus according to claim 4, wherein the text phrases comprise the words: too young, good, and big boy.

6. An apparatus according to claim 1, wherein at least a portion of at least one of the visual zones has a graduated ruler scale with numerical representations thereon.

7. An apparatus according to claim 1, further comprising a rigid vertical component for estimating heights of animals, the rigid vertical component being separate from the rigid body and having three (3) symmetrical visual zones including an immature zone having a single segment located at a lower end, a mature zone having a single segment located at an upper end, an intermediate zone having a single segment located between the immature zone and the mature zone, and the three (3) visual zones are equal in length with the intermediate zone symmetrically located between the immature and mature zones.

8. An apparatus according to claim 1, wherein the body comprises a substrate that is rectangular having a length of about 3 feet and a width of about 2 inches, and the graphic indicia is a single adhesive decal that is bonded to the substrate.

9. An apparatus for assisting hunters in estimating the size of a horizontal attribute of animals, comprising:
a body formed from a substrate that is stiff and rectangular in shape;
graphic indicia affixed to the substrate having a plurality of visual zones, each visual zone comprising a physical range of measurement and having a color that differs from other ones of the visual zones, the colors comprising a red immature zone, a yellow intermediate zone, and a green mature zone; wherein
the red immature zone has a single segment located in a center of the body, the green mature zone has two segments, each of which is located on respective ends of the body, and the yellow intermediate zone has two segments, each of which is located between the red immature zone and a respective one of the segments of the green mature zone;
the single segment of the red immature zone is longer than any other segment and is symmetrically positioned between the two segments of the yellow intermediate zone and the two segments of the green mature zone;
the segments of the yellow intermediate zone and the green mature zone are approximately equal in length; and
the body is adapted to be horizontally configured for estimating antler widths of animals.

10. An apparatus according to claim 9, wherein at least some of the visual zones have graduated ruler scales with numerical representations thereon.

11. An apparatus according to claim 9, wherein the red immature zone is about 13 inches long, the yellow intermediate zone is about 23 inches long from end to end, and the green mature zone is about 33 inches long from end to end.

12. An apparatus according to claim 9, wherein each visual zone has a text phrase that differs from other ones of the visual zones, and the text phrases comprise the words: "too young" for the red immature zone, "good" for the yellow intermediate zone, and "big boy" for the green mature zone.

13. An apparatus according to claim 9, wherein the body has a length of about 3 feet and a width of about 2 inches, and the graphic indicia is a single adhesive decal that is bonded to the substrate.

14. An apparatus according to claim 9, further comprising a separate, rigid vertical component for measuring heights of animals, the separate, rigid vertical component having a lower edge that is adapted to be located above and spaced apart from a ground surface, an immature zone having a single segment located at a lower end of the body and colored red, a mature zone comprising a single segment located at an upper end of the body and colored green, an intermediate zone comprising a single segment located between the immature zone and the mature zone and colored yellow, and the zones have a same length of about 11 inches each.

15. A method of sizing animals, comprising:
(a) horizontally configuring a rigid apparatus having graphic indicia with a red immature zone, a yellow intermediate zone, and a green mature zone, each zone comprising a physical range of measurement and having a symmetry about a center of the rigid apparatus, the red immature zone being a single segment located in the center, the green mature zone having two segments, each of which is located on respective ends of the rigid apparatus, and the yellow intermediate zone having two segments, each of which is located between the immature zone and a respective one of the segments of the green mature zone;
(b) visually perceiving the rigid apparatus from a distance when an animal is located in proximity to the rigid apparatus;
(c) estimating a width of antlers of the animal by comparing the width of the antlers to the zones on the rigid apparatus.

16. A method according to claim 15, wherein step (a) comprises labeling each zone with a text phrase that differs from other ones of the zones.

17. A method according to claim 15, wherein step (a) comprises labeling the zones with a graduated ruler scale having numerical representations.

18. A method according to claim 15, further comprising the steps of:

estimating a height of the animal by comparing the animal to a vertical component that is separate from and oriented vertically adjacent to the rigid apparatus, and configuring the vertical component with a red immature zone at a lower end, a green mature zone at an upper end, and a yellow intermediate zone between the immature zone and the mature zone.

* * * * *